(12) United States Patent
Olivier

(10) Patent No.: US 12,066,576 B2
(45) Date of Patent: Aug. 20, 2024

(54) BEAM-STEERING DEVICE PARTICULARLY FOR LIDAR SYSTEMS

(71) Applicant: LeddarTech Inc., Quebec (CA)

(72) Inventor: Pierre Olivier, Saint-Rédempteur (CA)

(73) Assignee: LeddarTech Inc., Quebec (CA)

( * ) Notice: Subject to any disclaimer, the term of this patent is extended or adjusted under 35 U.S.C. 154(b) by 0 days.

(21) Appl. No.: 18/079,620

(22) Filed: Dec. 12, 2022

(65) Prior Publication Data

US 2023/0243931 A1    Aug. 3, 2023

Related U.S. Application Data

(63) Continuation of application No. 17/382,177, filed on Jul. 21, 2021, now Pat. No. 11,567,179.

(60) Provisional application No. 63/136,765, filed on Jan. 13, 2021, provisional application No. 63/054,634, filed on Jul. 21, 2020.

(51) Int. Cl.
*G01S 7/481* (2006.01)
*G01S 7/499* (2006.01)
*G02F 1/29* (2006.01)

(52) U.S. Cl.
CPC ........... *G01S 7/4817* (2013.01); *G01S 7/499* (2013.01); *G02F 1/291* (2021.01)

(58) Field of Classification Search
None
See application file for complete search history.

(56) References Cited

U.S. PATENT DOCUMENTS

| | | |
|---|---|---|
| 3,045,231 A | 7/1962 | Emory |
| 3,954,335 A | 5/1976 | Bodlaj |
| 5,126,869 A | 6/1992 | Lipchak |
| 5,128,874 A | 7/1992 | Bhanu et al. |

(Continued)

FOREIGN PATENT DOCUMENTS

| | | |
|---|---|---|
| CA | 2710212 | 7/2009 |
| CA | 2782180 | 6/2011 |

(Continued)

OTHER PUBLICATIONS

WO 2016087025 A1 English (Year: 2016).*

(Continued)

*Primary Examiner* — Yuqing Xiao
*Assistant Examiner* — Jempson Noel
(74) *Attorney, Agent, or Firm* — Fish & Richardson P.C.

(57) ABSTRACT

A beam-steering engine, comprising an optical element switchable between a first operational mode and a second operational mode, in the first operational mode of the optical element the beam-steering engine is configured to output an input light beam incident on the beam-steering engine along a first propagation direction and in the second operational mode of the optical element the beam-steering engine is configured to output the input light beam incident on the beam-steering engine along a second propagation direction. A transition of the optical element between the first and second operational modes is characterized by a transition time period that varies with a temperature of the optical element. The beam-steering engine further includes a device to control a temperature of the solid-state optical element to maintain the transition time period below a certain limit.

20 Claims, 12 Drawing Sheets

(56) References Cited

U.S. PATENT DOCUMENTS

| | | |
|---|---|---|
| 5,195,144 A | 3/1993 | Parquier et al. |
| 5,198,657 A | 3/1993 | Trost et al. |
| 5,298,905 A | 3/1994 | Dahl |
| 5,396,510 A | 3/1995 | Wilson |
| 5,471,215 A | 11/1995 | Fukuhara |
| 5,565,870 A | 10/1996 | Fukuhara |
| 5,587,908 A | 12/1996 | Kajiwara |
| 5,633,901 A | 5/1997 | Bottman |
| 5,699,151 A | 12/1997 | Akasu |
| 5,745,806 A | 4/1998 | Saito |
| 5,812,249 A | 9/1998 | Johnson et al. |
| 5,831,717 A | 11/1998 | Ikebuchi |
| 5,852,491 A | 12/1998 | Kato |
| 5,870,178 A | 2/1999 | Egawa |
| 5,896,103 A | 4/1999 | Bunch |
| 5,923,417 A | 7/1999 | Leis |
| 5,933,225 A | 8/1999 | Yamabuchi |
| 5,987,395 A | 11/1999 | Donges |
| 6,100,539 A | 8/2000 | Blumcke |
| 6,115,112 A | 9/2000 | Hertzman |
| 6,115,114 A | 9/2000 | Berg et al. |
| 6,252,655 B1 | 6/2001 | Tanaka |
| 6,323,941 B1 | 11/2001 | Evans et al. |
| 6,502,053 B1 | 12/2002 | Hardin et al. |
| 6,522,393 B2 | 2/2003 | Higashino |
| 6,553,130 B1 | 4/2003 | Lemelson et al. |
| 6,587,185 B1 | 7/2003 | Ide |
| 6,606,054 B2 | 8/2003 | Okamura |
| 6,650,403 B2 | 11/2003 | Ogawa |
| 6,657,704 B2 | 12/2003 | Shirai |
| 6,665,057 B2 | 12/2003 | Schellmann |
| 6,710,859 B2 | 3/2004 | Shirai |
| 6,765,495 B1 | 7/2004 | Dunning et al. |
| 6,829,043 B2 | 12/2004 | Lewis |
| 6,847,462 B1 | 1/2005 | Kacyra et al. |
| 6,850,156 B2 | 2/2005 | Bloomfield et al. |
| 6,897,465 B2 | 5/2005 | Remillard |
| 6,989,781 B2 | 1/2006 | Steinbuch |
| 7,023,531 B2 | 4/2006 | Gogolla |
| 7,068,214 B2 | 6/2006 | Kakishita |
| 7,177,014 B2 | 2/2007 | Mori |
| 7,221,271 B2 | 5/2007 | Reime |
| 7,350,945 B2 | 4/2008 | Albou et al. |
| 7,385,626 B2 | 6/2008 | Aggarwal et al. |
| 7,417,718 B2 | 8/2008 | Wada et al. |
| 7,508,496 B2 | 3/2009 | Mettenleiter et al. |
| 7,619,754 B2 | 11/2009 | Reil et al. |
| 7,852,461 B2 | 12/2010 | Yahav |
| 7,957,639 B2 | 6/2011 | Lee et al. |
| 7,957,900 B2 | 6/2011 | Chowdhary et al. |
| 8,045,249 B2 | 10/2011 | Kobayashi et al. |
| 8,189,051 B2 | 5/2012 | Shih et al. |
| 8,290,208 B2 | 10/2012 | Kurtz et al. |
| 8,446,492 B2 | 5/2013 | Nakano et al. |
| 8,457,827 B1 | 6/2013 | Ferguson et al. |
| 8,547,374 B1 | 10/2013 | Sadjadi et al. |
| 8,548,229 B2 | 10/2013 | Badino et al. |
| 8,587,686 B1 | 11/2013 | Riza et al. |
| 8,723,717 B2 | 5/2014 | Saito |
| 8,736,818 B2 | 5/2014 | Weimer |
| 8,761,594 B1 | 6/2014 | Gross et al. |
| 8,791,851 B2 | 7/2014 | Elad et al. |
| 8,908,159 B2 | 12/2014 | Mimeault |
| 8,982,313 B2 | 3/2015 | Escuti et al. |
| 8,996,224 B1 | 3/2015 | Herbach |
| 9,063,549 B1 | 6/2015 | Pennecot |
| 9,098,754 B1 | 8/2015 | Stout |
| 9,164,511 B1 | 10/2015 | Ferguson et al. |
| 9,188,980 B2 | 11/2015 | Anderson |
| 9,774,789 B2 | 9/2017 | Ciurea |
| 10,098,727 B1 | 10/2018 | Galstian |
| RE47,134 E | 11/2018 | Mimeault |
| 10,191,156 B2 | 1/2019 | Steinberg et al. |
| 10,412,368 B2 | 9/2019 | Osterwood |
| 10,571,552 B1 | 2/2020 | Gao |
| 10,825,010 B2 | 11/2020 | Olmstead |
| 10,832,438 B2 | 11/2020 | Gozu |
| 10,884,278 B2 | 1/2021 | Hegyi |
| 11,022,857 B2 | 6/2021 | Lee |
| 11,061,406 B2 | 7/2021 | Mao |
| 11,087,494 B1 | 8/2021 | Srinivasan |
| 11,567,179 B2 | 1/2023 | Oliver |
| 2001/0024271 A1 | 9/2001 | Takayanagi |
| 2001/0045981 A1 | 11/2001 | Gloger et al. |
| 2002/0097995 A1 | 7/2002 | Nakata |
| 2002/0141618 A1 | 10/2002 | Ciolli |
| 2003/0193642 A1 | 10/2003 | Tominaga et al. |
| 2004/0035620 A1 | 2/2004 | McKeeferey |
| 2004/0036834 A1 | 2/2004 | Ohnishi et al. |
| 2004/0135992 A1 | 7/2004 | Munro |
| 2004/0164946 A1 | 8/2004 | Cavanaugh et al. |
| 2005/0117364 A1 | 6/2005 | Rennick et al. |
| 2005/0200832 A1 | 9/2005 | Kawai et al. |
| 2005/0269481 A1 | 12/2005 | David et al. |
| 2006/0072099 A1 | 4/2006 | Hoashi |
| 2006/0147089 A1 | 7/2006 | Han et al. |
| 2006/0149472 A1 | 7/2006 | Han et al. |
| 2006/0186702 A1 | 8/2006 | Kisanuki et al. |
| 2006/0274545 A1 | 12/2006 | Rosenstein |
| 2006/0274918 A1 | 12/2006 | Amantea et al. |
| 2007/0024841 A1 | 2/2007 | Kloza |
| 2007/0091294 A1 | 4/2007 | Hipp |
| 2007/0097349 A1 | 5/2007 | Wada |
| 2007/0165967 A1 | 7/2007 | Ando |
| 2007/0181810 A1 | 8/2007 | Tan |
| 2007/0187573 A1 | 8/2007 | Aoki |
| 2007/0189455 A1 | 8/2007 | Allison |
| 2007/0255525 A1 | 11/2007 | Lee |
| 2008/0046150 A1 | 2/2008 | Breed |
| 2008/0077327 A1 | 3/2008 | Harris |
| 2008/0199165 A1 | 8/2008 | Ng et al. |
| 2008/0297870 A1 | 12/2008 | Kobayashi et al. |
| 2009/0102699 A1 | 4/2009 | Behrens et al. |
| 2009/0109082 A1 | 4/2009 | Rose |
| 2009/0251680 A1 | 10/2009 | Farsaie |
| 2010/0014781 A1 | 1/2010 | Liu et al. |
| 2010/0040285 A1 | 2/2010 | Csurka et al. |
| 2010/0091263 A1 | 4/2010 | Kumagai |
| 2010/0157280 A1 | 6/2010 | Kusevic |
| 2010/0191117 A1 | 7/2010 | Kabakov |
| 2010/0204974 A1 | 8/2010 | Israelsen |
| 2010/0211247 A1 | 8/2010 | Sherony |
| 2010/0235129 A1 | 9/2010 | Sharma |
| 2010/0245535 A1 | 9/2010 | Mauchly |
| 2010/0315618 A1 | 12/2010 | Hertzman |
| 2011/0026008 A1 | 2/2011 | Gammenthaler |
| 2011/0081043 A1 | 4/2011 | Sabol |
| 2011/0134249 A1 | 6/2011 | Wood et al. |
| 2011/0141306 A1 | 6/2011 | Nakano et al. |
| 2011/0292406 A1 | 12/2011 | Hollenbeck et al. |
| 2012/0021595 A1 | 1/2012 | Kim |
| 2012/0026510 A1 | 2/2012 | Crampton et al. |
| 2012/0035788 A1 | 2/2012 | Trepagnier |
| 2012/0038902 A1 | 2/2012 | Dotson |
| 2012/0044093 A1 | 2/2012 | Pala |
| 2012/0044476 A1 | 2/2012 | Earhart et al. |
| 2012/0148100 A1 | 6/2012 | Kotake et al. |
| 2012/0188467 A1* | 7/2012 | Escuti ............... G02F 1/1347 349/1 |
| 2012/0206627 A1 | 8/2012 | Reschidko et al. |
| 2012/0229304 A1 | 9/2012 | Dalal |
| 2012/0214037 A1 | 12/2012 | Nehmadi |
| 2012/0310518 A1 | 12/2012 | Chen et al. |
| 2012/0326959 A1 | 12/2012 | Murthi et al. |
| 2013/0021595 A1 | 1/2013 | Guetta |
| 2013/0050430 A1 | 2/2013 | Lee |
| 2013/0107065 A1 | 5/2013 | Venkatraman et al. |
| 2013/0174102 A1 | 7/2013 | Leu |
| 2014/0077988 A1 | 3/2014 | Saito |
| 2014/0078263 A1 | 3/2014 | Kim |
| 2014/0094307 A1 | 4/2014 | Doolittle et al. |
| 2014/0118716 A1 | 5/2014 | Kaganovich |
| 2014/0132722 A1 | 5/2014 | Bauza et al. |
| 2014/0139639 A1 | 5/2014 | Wagner et al. |

(56) References Cited

U.S. PATENT DOCUMENTS

| | | |
|---|---|---|
| 2014/0240464 A1 | 8/2014 | Lee |
| 2014/0267631 A1 | 9/2014 | Powers |
| 2014/0280230 A1 | 9/2014 | Masato et al. |
| 2014/0358429 A1 | 12/2014 | Shutko |
| 2015/0071541 A1 | 3/2015 | Qutub et al. |
| 2015/0285912 A1 | 10/2015 | Hammes |
| 2015/0310273 A1 | 10/2015 | Shreve |
| 2015/0340875 A1 | 11/2015 | Prasad et al. |
| 2015/0356357 A1 | 12/2015 | McManus et al. |
| 2015/0362587 A1 | 12/2015 | Rogan |
| 2015/0379766 A1 | 12/2015 | Newman |
| 2016/0018526 A1 | 1/2016 | Van Den Bossche |
| 2016/0047903 A1 | 2/2016 | Dussan |
| 2016/0104289 A1 | 4/2016 | Chang |
| 2016/0144695 A1 | 5/2016 | Higgins |
| 2016/0180530 A1 | 6/2016 | Friend |
| 2016/0214607 A1 | 7/2016 | Dolgov et al. |
| 2016/0295196 A1 | 10/2016 | Finn |
| 2017/0003392 A1 | 1/2017 | Bartlett et al. |
| 2017/0124781 A1 | 5/2017 | Douillard |
| 2017/0160600 A1 | 6/2017 | Galstian et al. |
| 2017/0246990 A1 | 8/2017 | Rosenblum |
| 2017/0269198 A1 | 9/2017 | Hall et al. |
| 2017/0328990 A1* | 11/2017 | Magee ................ G01S 17/931 |
| 2017/0371227 A1 | 12/2017 | Skirlo et al. |
| 2018/0081037 A1 | 3/2018 | Medina |
| 2018/0114388 A1 | 4/2018 | Nagler |
| 2018/0136321 A1 | 5/2018 | Verghese |
| 2018/0136540 A1 | 5/2018 | Park |
| 2018/0188359 A1 | 7/2018 | Droz |
| 2018/0189977 A1 | 7/2018 | Zecchini |
| 2018/0284286 A1 | 10/2018 | Eichenholz et al. |
| 2018/0293445 A1 | 10/2018 | Gao |
| 2018/0364334 A1 | 12/2018 | Xiang |
| 2019/0011541 A1 | 1/2019 | O'Keeffe |
| 2019/0025427 A1 | 1/2019 | O'Keeffe |
| 2019/0075281 A1* | 3/2019 | Hall ...................... G02B 26/10 |
| 2019/0121191 A1 | 4/2019 | Hegyi |
| 2019/0176844 A1 | 6/2019 | Sedlmayr |
| 2019/0219675 A1 | 7/2019 | Yoon |
| 2019/0219681 A1 | 7/2019 | Atshushi |
| 2019/0227175 A1 | 7/2019 | Steinberg |
| 2019/0271767 A1 | 9/2019 | Keilaf |
| 2019/0317217 A1 | 10/2019 | Day et al. |
| 2019/0318177 A1 | 10/2019 | Steinberg |
| 2019/0353784 A1 | 11/2019 | Toledano |
| 2020/0013181 A1 | 1/2020 | Uyeno |
| 2020/0033454 A1 | 1/2020 | Hong et al. |
| 2020/0072950 A1 | 3/2020 | Phillip |
| 2020/0099824 A1 | 3/2020 | Benemann |
| 2020/0099872 A1 | 3/2020 | Benemann |
| 2020/0284883 A1 | 9/2020 | Ferreira |
| 2020/0353939 A1 | 11/2020 | Meng |
| 2021/0003711 A1 | 1/2021 | Vandenberg |
| 2021/0025997 A1 | 1/2021 | Rosenzweig |
| 2021/0041712 A1 | 2/2021 | Bilik et al. |
| 2021/0063841 A1 | 3/2021 | Yuan |
| 2021/0080575 A1 | 3/2021 | Nehmadi |
| 2021/0124367 A1 | 4/2021 | Lim |
| 2021/0129868 A1 | 5/2021 | Nehmadi |
| 2021/0190958 A1 | 6/2021 | Nonaka |
| 2021/0208263 A1 | 7/2021 | Sutavani |
| 2021/0255637 A1 | 8/2021 | Kale |
| 2021/0293931 A1 | 9/2021 | Nemet |
| 2022/0026539 A1 | 1/2022 | Bernier |
| 2022/0026540 A1 | 1/2022 | Olivier |
| 2022/0026573 A1 | 1/2022 | Baribault |
| 2022/0026576 A1 | 1/2022 | Baribault |

FOREIGN PATENT DOCUMENTS

| | | |
|---|---|---|
| CN | 106462949 | 8/2019 |
| DE | 3535391 | 5/1990 |
| DE | 10361869 | 7/2005 |
| DE | 102019132239 | 6/2021 |
| EP | 2204670 | 6/2014 |
| JP | H04172285 | 6/1992 |
| JP | 912723 | 5/1997 |
| JP | 2005170184 | 6/2005 |
| JP | 2006521536 | 9/2006 |
| JP | 2007121116 | 5/2007 |
| JP | 09178786 | 8/2009 |
| JP | 09222476 | 10/2009 |
| JP | 2010091378 | 4/2010 |
| JP | 2010529932 | 9/2010 |
| JP | 2010286307 | 12/2010 |
| JP | 11101637 | 5/2011 |
| WO | WO1991007672 | 5/1991 |
| WO | WO2000012960 | 3/2000 |
| WO | WO2005008271 | 1/2005 |
| WO | WO2008017316 | 2/2008 |
| WO | WO2008070319 | 6/2008 |
| WO | WO2011014743 | 2/2011 |
| WO | WO2011077400 | 6/2011 |
| WO | WO-2016087025 A1 * | 6/2016 ............. F21S 41/16 |
| WO | WO2018055449 | 3/2018 |
| WO | WO2019106429 | 6/2019 |
| WO | WO2019197894 | 10/2019 |
| WO | WO-2020023969 A1 * | 1/2020 ........... G01C 15/002 |

OTHER PUBLICATIONS

Akindinov et al., Detection of Light Pulses Using an Avalanche Photodiode Array with a Metal-Resistor-Semiconductor Structure, Instruments and Experimental Techniques, Nov. 2004, vol. 48, No. 3, 205, pp. 355-363, Russia.

Atiq et al., "Vehicle Detection and Shape Recognition Using Optical Sensors: A Review", 2010 Second International Conference on Machine Learning and Computing, Feb. 11, 2010 (Feb. 11, 2010).

Baig et al., "Fusion Between Laser and Stereo Vision Data For Moving Objects Tracking in Intersection Like Scenario", Fusion Between IV'2011—IEEE Intelligent Vehicles Symposium, Jun. 2011, Baden-Baden, Germany. pp. 262-367, ff10.1109/IVS.2011.5940576ff.

Braun et al., "Nanosecond transient electroluminescence from polymer light emitting diodes", Applied Physics Letters, vol. 61(26):3092-3094 (Dec. 1992).

CA Requisition in Canadian Appln. No. 3125618, dated Oct. 15, 2021, 4 pages.

CA Requisition in Canadian Appln. No. 3125623, dated Nov. 1, 2021, 4 pages.

CA Requisition in Canadian Appln. No. 3125716, dated Oct. 18, 2021, 4 pages.

CA Requisition in Canadian Appln. No. 3125718, dated Nov. 25, 2021, 3 pages.

Canadian Examiners Report in CA Appln. No. 2865733, dated May 31, 2021, 3 pages.

English translation of the Notification of Reasons for Rejection issued in Japanese Patent Application No. 2018077339, dated Mar. 25, 2019, 8 pages.

EP Search Report in EP Appln. No. 16774190.9, dated Jan. 28, 2019.

Escuti, Michael J. and W. Michael Jones, "Polarization-Independent Switching With High Contrast From a Liquid Crystal Polarization Grating", Society for Information Display, 2006.

Final Office Action issued Apr. 18, 2018 in connection with U.S. Appl. No. 15/373,189, 9 pages.

International Preliminary Report on Patentability in International Application No. PCT/IB2013/051667, dated Sep. 2, 2014, 6 pages.

International Search Report and Written Opinion for PCT/US2016/025252, Moscow, Russia, Date of Mailing Aug. 11, 2016.

International Search Report and Written Opinion in International Application No. PCT/IB2013/051667, dated Jul. 9, 2013, 8 pages.

Kim et al., "Wide-Angle, Nonmechanical Beam Steering Using Thin Liquid Crystal Polarization Gratings", Advanced Wavefront Control: Methods, Devices and Applications VI, 2008, 7093:709302-1-12.

Non-Final Office Action issued Oct. 31, 2017 in connection with U.S. Appl. No. 15/373,189, 31 pages.

(56) References Cited

OTHER PUBLICATIONS

Notice of Allowance issued Jul. 13, 2018 in connection with U.S. Appl. No. 15/373,189 (13 pages).
Notice of Allowance issued Mar. 8, 2018 in connection with U.S. Appl. No. 14/984,704, (8 pages).
Office Action in U.S. Appl. No. 17/382,144, dated Nov. 19, 2021, 17 pages.
Office Action in U.S. Appl. No. 17/382,155, dated Dec. 24, 2021, 23 pages.
Office Action in U.S. Appl. No. 17/382,163, dated Jan. 13, 2022, 31 pages.
Office Action in U.S. Appl. No. 17/382,177, dated Dec. 21, 2021, 25 pages.
Office Action issued Jun. 15, 2017 in connection with U.S. Appl. No. 14/984,704, (13 pages).
Office Action issued Oct. 9, 2019 in connection with U.S. Appl. No. 16/011,820 (25 pages).
Office Action issued Sep. 17, 2019 in connection with U.S. Appl. No. 15/867,995 (38 pages).
PCT International Preliminary Report on Patentability in International Appln. No. PCT/IL2018/050102, dated Aug. 6, 2019, 10 pages.
PCT International Search Report and Written Opinion in International Appln. No. PCT/CA2021/051010, dated Oct. 4, 2021, 18 pages.
PCT International Search Report and Written Opinion in International Appln. No. PCT/CA2021/051011, dated Oct. 6, 2021, 15 pages.
PCT International Search Report and Written Opinion in International Appln. No. PCT/CA2021/051012, dated Nov. 2, 2021, 11 pages.
PCT International Search Report and Written Opinion in International Appln. No. PCT/CA2021/051013, dated Oct. 21, 2021, 21 pages.
PCT International Search Report and Written Opinion in International Appln. No. PCT/IL2018/50102, dated Aug. 8, 2018, 14 pages.
Petrovskaya et al., "Awareness of Road Scene Participants for Autonomous Driving", Stanford University (USA), Inria (France), Coimbra University (Portugal), University of Frieburg (Germany), University of Oxford (UK), Ohio Northern University (USA), Oct. 12, 2011.
Supplemental Notice of Allowability issued Sep. 12, 2018 in connection with U.S. Appl. No. 15/373,189 (4 pages).
CA Notice of Allowance in Canadian Appln. No. 3,125,623, mailed on Jan. 12, 2023, 1 page.
CA Office Action in Canadian Appln. No. 3,125,623, mailed on May 26, 2022, 5 pages.
US Office Action in U.S. Appl. No. 17/382,177, mailed on Jun. 30, 2022, 11 pages.
US Office Action in U.S. Appl. No. 17/382,177, mailed on Mar. 9, 2022, 11 pages.
US Office Action in U.S. Appl. No. 17/382,177, mailed on Sep. 14, 2022, 5 pages.

* cited by examiner solid state steering engine

| Sequence of tiles | Switching commands sequence |
|---|---|
|  | Commands sequence # 1 |
|  | Commands sequence # 2 |
|  | Commands sequence # 3 |

BEAM-STEERING DEVICE PARTICULARLY FOR LIDAR SYSTEMS

CROSS-REFERENCE TO RELATED APPLICATIONS

This application is a continuation application of and claims the benefit of priority to U.S. application Ser. No. 17/382,177, filed on Jul. 21, 2021, which claims priority under 35 USC 119(e) to U.S. Patent Application Ser. No. 63/136,765, filed on Jan. 13, 2021 and U.S. Patent Application Ser. No. 63/054,634, filed on Jul. 21, 2020, the entire contents of which are hereby incorporated by reference.

FIELD OF THE INVENTION

The invention relates to a beam-steering device and a method for operation of a beam-steering device, particularly for LIDAR systems using one or more light beam-steering stages to selectively deflect a light beam.

BACKGROUND OF THE INVENTION

Beam-steering devices using one or more steering stages are described in the U.S. Pat. No. 8,982,313, the contents of which are hereby incorporated by reference. In a specific example of implementation, each steering stage includes a polarization grating with a director pattern that interacts with incoming light to deflect the light at a selected propagation angle. In the active version of the steering stage, the polarization grating includes a switchable liquid crystal layer having a periodic profile of spatially varying optical anisotropy, for example as provided by a birefringent liquid crystal material. The polarization grating is capable of diffracting incident light into three possible diffracted orders ($0^{th}$, $+1^{st}$ and $-1^{st}$) according to input polarization and applied voltage.

More specifically, the polarization grating is switchable between at least two operational modes. The switching alters the periodic profile of the grating such that the grating interacts with incoming light differently in each operational mode. Accordingly, the switching provides a level of control over the direction of propagation of the light. The switching operation is characterized by an on mode and an off mode. The on mode is achieved by applying a voltage to the grating which induces a change to the periodic profile. For instance, the voltage can alter the profile such that the grating will no longer deflect the light at some angle. Rather the light will propagate along its incoming direction. The off mode is achieved by removing the voltage which allows the periodic profile to acquire its original configuration in which it deflects the light. As such, when voltage is applied to the grating, the light deflecting effect is negated. And when no voltage is applied, the periodic pattern deflects lights at an angle. That angle can be positive or negative depending on the polarization handedness of the incoming light beam.

The polarization of the incident light introduced into the polarization grating is controlled by a polarization selector, which is also switchable. Typically, the polarization selector is placed before the polarization grating. The polarization selector may include a liquid-crystal layer operable to be switched between a first mode that does not substantially alter the polarization of the incident light and a second mode that alters the polarization state of light passing through it.

In the passive version, the polarization grating is not switchable. The polarization selector is still switchable. In this version, the polarization grating is capable of diffracting incident light in two diffracted orders ($+1^{st}$, $-1^{st}$), the order selection being made by controlling the polarization of the incident light beam with the polarization selector.

The switching operation of the polarization grating and/or of the polarization selector is not an instantaneous event. In other words, some time is required after a voltage is applied for the operational mode of the optical component to change. Similarly, when the voltage is removed a relaxation time is required for the optical component to revert back to its initial operational mode. Typically, the relaxation time is significantly longer than the switching on time. The relaxation time and the switching on time are transition periods during which the optical component does not behave as expected in terms of light transmission properties. It is therefore preferable not to rely on the optical component during those transitions for predictable light management performance.

The disadvantage of the switching on time and the relaxation time is that the beam-steering rate is limited. Moving the beam from one step to the next step requires waiting for the switching on time and/or relaxation time to pass.

It is therefore an objective of the invention to provide improved methods and systems for better management of the LIDAR apparatus using a beam-steering engine, in particular better management of the transitions times between operational modes of the beam-steering engine.

SUMMARY OF THE INVENTION

As embodied and broadly described herein, the invention provides a beam-steering engine, comprising an optical element switchable between a first operational mode and a second operational mode, in the first operational mode of the optical element the beam-steering engine is configured to output an input light beam incident on the beam-steering engine along a first propagation direction and in the second operational mode of the optical element the beam-steering engine is configured to output the input light beam incident on the beam-steering engine along a second propagation direction. A transition of the optical element between the first and second operational modes is characterized by a transition time period that varies with a temperature of the optical element. The beam-steering engine further includes a device to control a temperature of the solid-state optical element to maintain the transition time period below a certain limit.

As embodied and broadly described herein, the invention further includes a method for steering a light beam, comprising providing a steering engine comprising an optical element switchable between a first operational mode and a second operational mode, in the first operational mode of the optical element the steering engine is configured to output an input light beam incident on the steering engine along a first propagation direction, in the second operational mode of the optical element the steering engine is configured to output the input light beam along a second propagation direction, a transition of the optical element between the first and second operational modes being characterized by a transition time period that varies with a temperature of the optical element. The method further including directing an input light beam at the optical element, switching the optical element in a selected operational mode to direct the beam output by the steering engine in a selected propagation direction, and controlling a temperature of the optical element to maintain the transition time below a certain limit.

As embodied and broadly described herein the invention provides a LIDAR apparatus for scanning a scene, comprising a transmitter stage for generating a light beam, a receiver stage and a beam-steering engine configured to steer the light beam to scan at least a portion of the scene. The beam-steering engine including a first steering stage to steer the light beam by performing continuous deflection of the light beam and a second steering stage to steer the light beam steered by the first steering stage by performing stepwise deflection of the light beam steered by the first steering stage.

As embodied and broadly described herein, the invention further includes a method for scanning a scene, comprising providing a LIDAR apparatus including a transmitter stage for generating a light beam, a receiver stage, a beam-steering engine configured to steer the light beam to scan at least a portion of the scene, the beam-steering engine including a first steering stage to steer the light beam by performing continuous deflection of the light beam and a second steering stage downstream the first steering stage to steer the light beam steered by the first steering stage by performing stepwise deflection of the light beam. The method including deflecting the light beam by the first steering stage with a continuous motion and deflecting the light beam stepwise by the second steering stage to scan the scene and sensing an optical return with the receiver stage and generating an output conveying a representation of the scene.

As embodied and broadly described herein, the invention further provides a LIDAR apparatus for scanning a scene, comprising a transmitter stage for generating a light beam, a receiver stage, a beam-steering engine configured to steer the light beam received from the transmitter stage to scan at least a portion of the scene, the beam-steering engine including an optical component, the beam-steering engine being responsive to steering commands to steer the light beam in a steering range by performing an angular deflection of the light beam in discrete steps within the steering range. The LIDAR apparatus further includes a controller comprising a data processor for receiving at an input data describing a sub-portion of the scene to be scanned by the LIDAR apparatus and deriving from the input data steering commands configured to operate the steering engine such that the light beam is directed at the sub-portion of the scene.

As embodied and broadly described herein the invention further includes a method for scanning a scene, comprising generating a light beam, providing a beam-steering engine configured to steer the light beam to scan at least a portion of the scene, the beam-steering engine including an optical component, the beam-steering engine being responsive to steering commands to steer the light beam in a steering range by performing an angular deflection of the light beam in discrete steps within the steering range, receiving data describing a sub-portion of the scene to be scanned by the light beam, and processing the data with a data processing device to generate steering commands configured to operate the steering engine such that the light beam is directed at the sub-portion of the scene.

DESCRIPTION OF AN EXAMPLE OF IMPLEMENTATION

Figure 1:
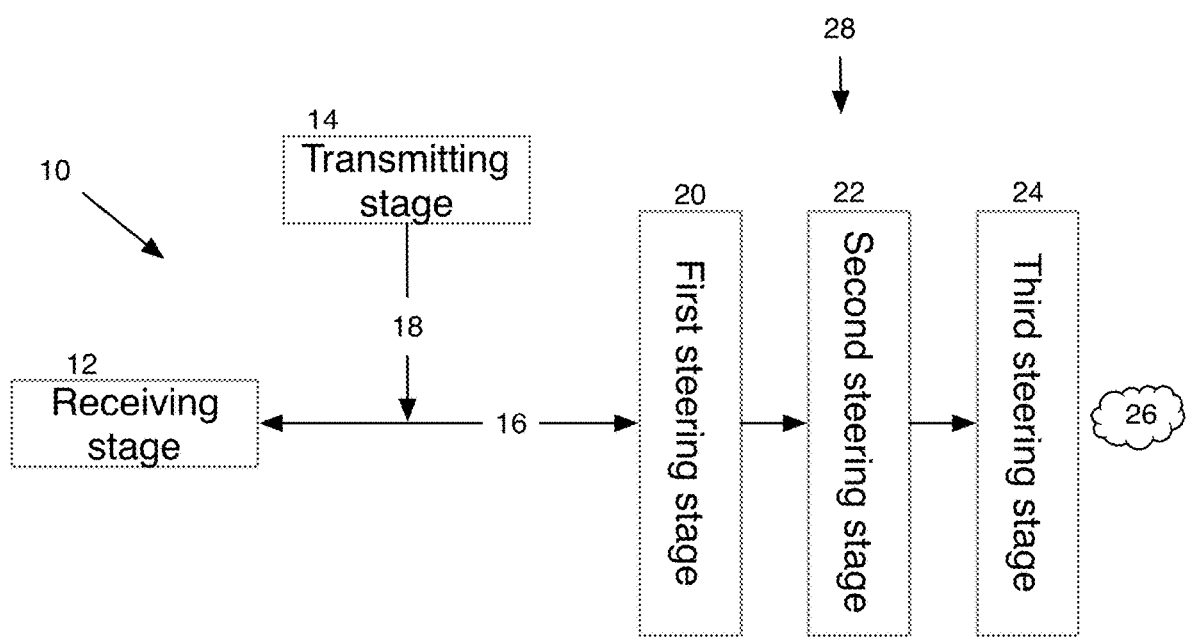
FIG. 1 is a block diagram illustrating components of a LIDAR apparatus using beam-steering.

With reference to FIG. 1, a LIDAR apparatus 10 is shown which creates a point cloud depicting the scene 26. The LIDAR apparatus includes a transmitting stage 14, which includes a light source to illuminate the scene 26. Objects in the scene 26 will reflect or back scatter the projected light. The light returns are sensed by the receiving stage 12, where they are converted into electrical signals. The light returns convey distance information from objects in the scene 26 which can be measured on the basis of Time Of Flight (TOF) and Frequency-Modulated Continuous-Wave (FMCW), among others. A controller shown in FIG. 10 converts the electrical signals into a point cloud which is a set of data points in space that represent a 3D shape of the scene. Typically, but not always, each data point has a set of X, Y and Z coordinates.

The LIDAR apparatus 10 has a beam-steering engine 28, including multiple beam-steering stages. The LIDAR apparatus can be placed either at the back or front of a host vehicle to create a representation of the environment in which the vehicle travels. In the example shown, the beam-steering engine has three beam-steering stages 20, 22 and 24, respectively. Each beam-steering stage is designed to deflect the light beam by a certain angle. The angular deflections produced at each stage add up (or subtract) to produce an outgoing beam that is directed at the scene 26. By altering the deflection angles at the beam-steering stages 20, 22 and 24 it is possible to displace the outgoing beam in a scanning motion and thus scan the scene.

Generally speaking, multiple beam-steering stages are useful because they can increase the overall angular beam deflection range at the output of the LIDAR apparatus and also increase the number of discrete angular steps within that overall range for an increased scanning resolution. In this example, three steering stages are being used, but it should be understood that more than three or less than three steering stages can be used. A steering engine consisting of a single steering stage can be used.

The beam-steering stages can operate on the basis the same or different beam-steering technologies. For example, the first beam-steering stage 20 includes a moveable optical element. The optical element is designed to reflect or diffract the incoming beam and by changing the position or orientation of the optical element the properties of the outgoing beam change, such as the angle of the propagation of the beam. In a specific example, the optical element can be a Micro-ElectroMechanical System (MEMS) using a moveable mirror to deflect the incoming beam and produce a scanning pattern of light. The MEMs mirror is controlled by a scanning mechanism that imparts to the mirror a cyclical movement producing a repeating scan of the outgoing beam. The scan can walk the beam in the horizontal direction, the vertical direction or have a hybrid pattern, such as for example a raster pattern. Typically, the movement of a MEMS mirror is a continuous movement over a predetermined angular steering range such as to produce a continuous displacement of the beam into the scene. By continuous displacement is meant a displacement where the mirror has either an infinite number of steps within the steering range or a finite number of micro steps, but the number of micro steps largely exceeds the discrete angular steering steps of the other steering stages. For example, the mirror may be configured to move in micro steps where each produces an angular deflection of less than 0.1 degree. In contrast, angular discrete steering steps, which is the mode of operation of the second and the third steering stages, are steps where the angular deflection from one step to the other is much larger, in the order of 2 degrees, 4 degrees, 5 degrees, 6 degrees or more per step.

The second beam-steering stage 22 is a solid-state beam-steering stage using optical elements to selectively impart to the light beam a propagation direction that defines a non-zero angle with relation to the direction of incidence of the incoming beam. In this example, the beam steering stage 22 operates such that the beam is steered without any mechanical motion of the optical component performing the beam steering. In a specific example of implementation, the second stage uses a static grating with a director pattern that interacts with the incoming light to diffract the light in a direction of propagation that is determined by the director pattern properties. Optionally, in the so called, "active" configuration, the polarization grating is such that the director pattern can be selectively turned "on" or "off". In the operational "on" state, the director pattern re-directs the light in a propagation direction at the desired angle. In the "off" state the director pattern acts as a pass-through optical element and does not re-direct the light beam.

The sign of the light deflection angle when the director pattern is in the "on" state can be controlled by the handedness of the circular polarization of the incoming light beam. For instance, when the incoming beam has a right-hand circular polarization the director pattern deflects the light beam in one direction, while if the incoming beam has a left-hand circular polarization the director pattern deflects the light beam in the opposite direction. Accordingly, the outgoing beam can propagate along one of three possible directions: (1) a positive deflection angle; (2) no deflection and (3) a negative deflection angle.

In a variant, in the passive configuration, the polarization grating is not switchable. In this configuration the polarization grating produces either a positive deflection angle or a negative deflection angle.

Thus, the solid-state second beam-steering stage 22 is a beam-steering device that can move the beam in discrete steps throughout the scan range. It is therefore advantageous to use in the beam-steering engine 28 a steering stage that provides a continuous beam motion to provide a continuous motion of the beam projected from the LIDAR apparatus or at the least reduce the angular spacing between the beam steps.

Figure 9:
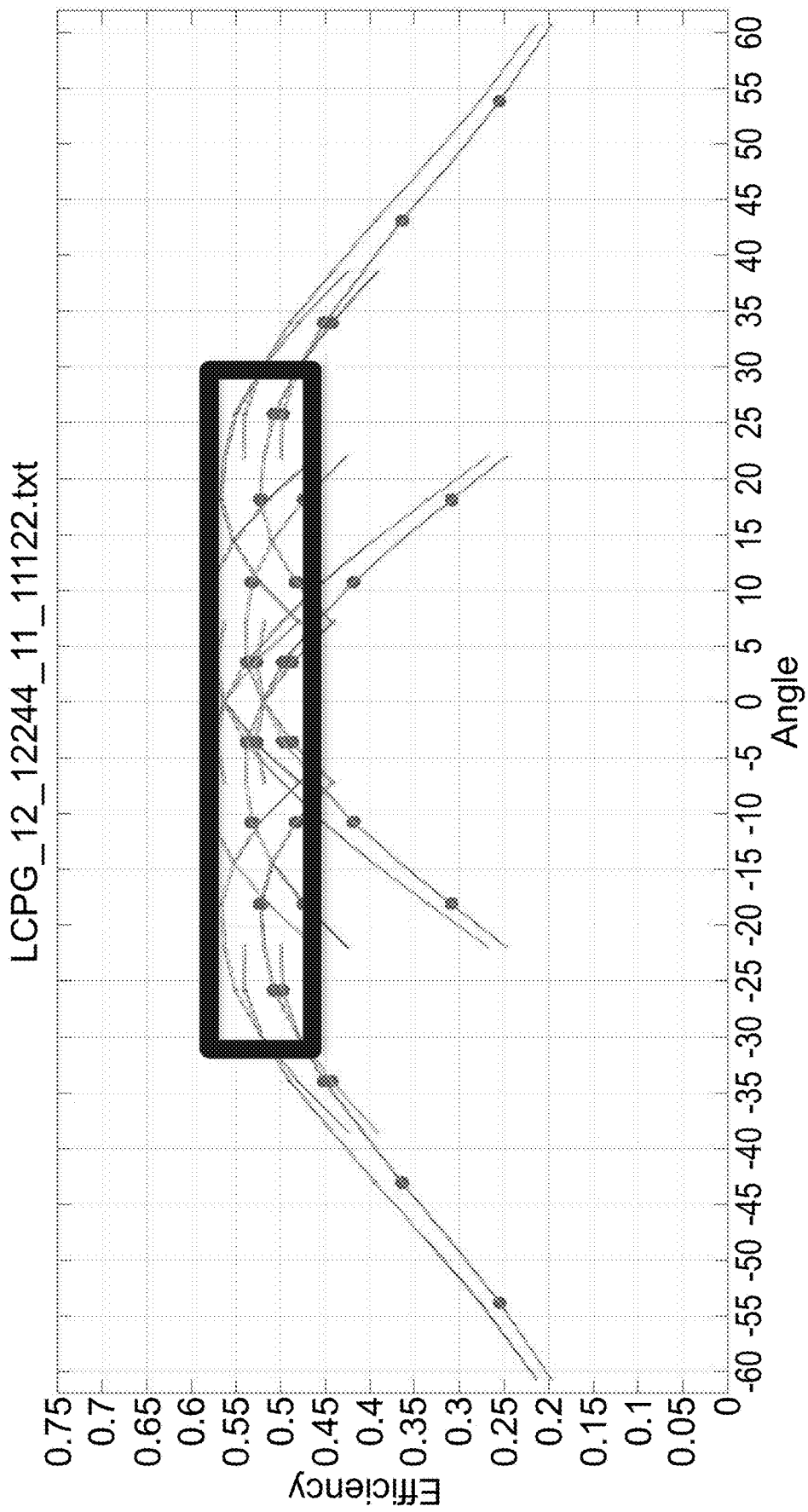
FIG. 9 is a graph illustrating the efficiency of a steering engine of the LIDAR apparatus shown in FIG. 1.

The third steering stage 24 can be identical to the second steering stage 22 and can be used to amplify the deflection angle of the beam and or add more discrete steps. In practice, a grating with a director pattern operates in a relatively high efficiency range if the light deflection is kept below a certain angular deflection. Above this angular deflection the efficiency drops. For that reason, it may be preferable to stack up several gratings, each deflecting the light by a certain angle that is within the high efficiency range, where the individual deflection angles add-up to a larger deflection angle. With specific reference to the graph shown in FIG. 9, it will be noted that angular deflections that are less than about plus or minus 8 degrees maintain a high degree of efficiency, however the efficiency drops with higher angles.

With specific reference now to FIG. 2 the transmitting and the receiving stages 12 and 14 will be described in greater detail. The transmitting stage 14 has a laser source 30 that can operate in the 900 nm range or alternatively in the 1500 nm range. The outgoing laser beam is focused by collimating optics 32 toward an optical path that is shared by the transmitting stage 14 and the receiving stage 12, including a beam splitter 38 which separates the outgoing beam from the optical returns. In the case of the incoming beam received from the collimating optics 32, the laser light is highly polarized such that most of the energy is reflected by the beam splitter, which can be a polarization beam splitter toward the beam-steering engine 28 over the optical path 16. As to reflected or back-scattered light collected from the scene 26 and which is transmitted through the steering engine 28, the light is transmitted back over the optical path toward the beam splitter 38. However, since this light has lost a significant degree of polarization, the bulk of the energy is transmitted through the beam splitter 38 toward the receiving stage 12.

This shared optical path configuration has advantages in terms of simplicity and compactness, at the expense of some optical losses.

The returning optical light from the beam splitter 38 is received by an objective 36 which focuses the light on the sensitive surface of an optical receiver 34. The receiver 34 may be one using Avalanche Photo Diodes (APDs). While not shown in the drawings the electrical output of the receiver 34 is directed at the controller 68 shown in FIG. 10 that generates the point cloud.

The controller 68 also controls the operation of the transmitting stage 14 and the operation of the steering engine 28 such as to synchronize all these components.

Figure 2:
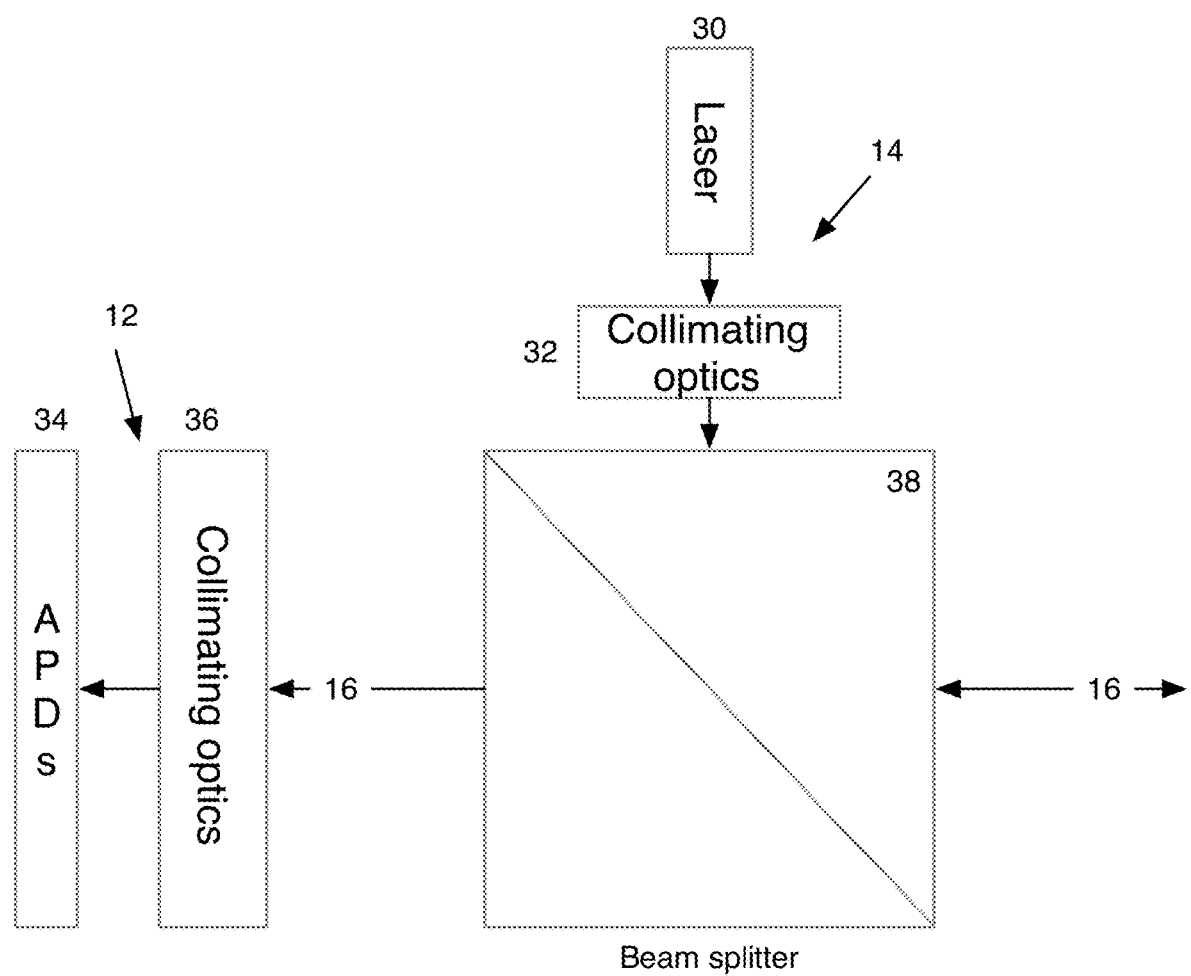
FIG. 2 is a more detailed block diagram of the receiving and transmitting stages of the LIDAR apparatus shown in FIG. 1.
Figure 3:
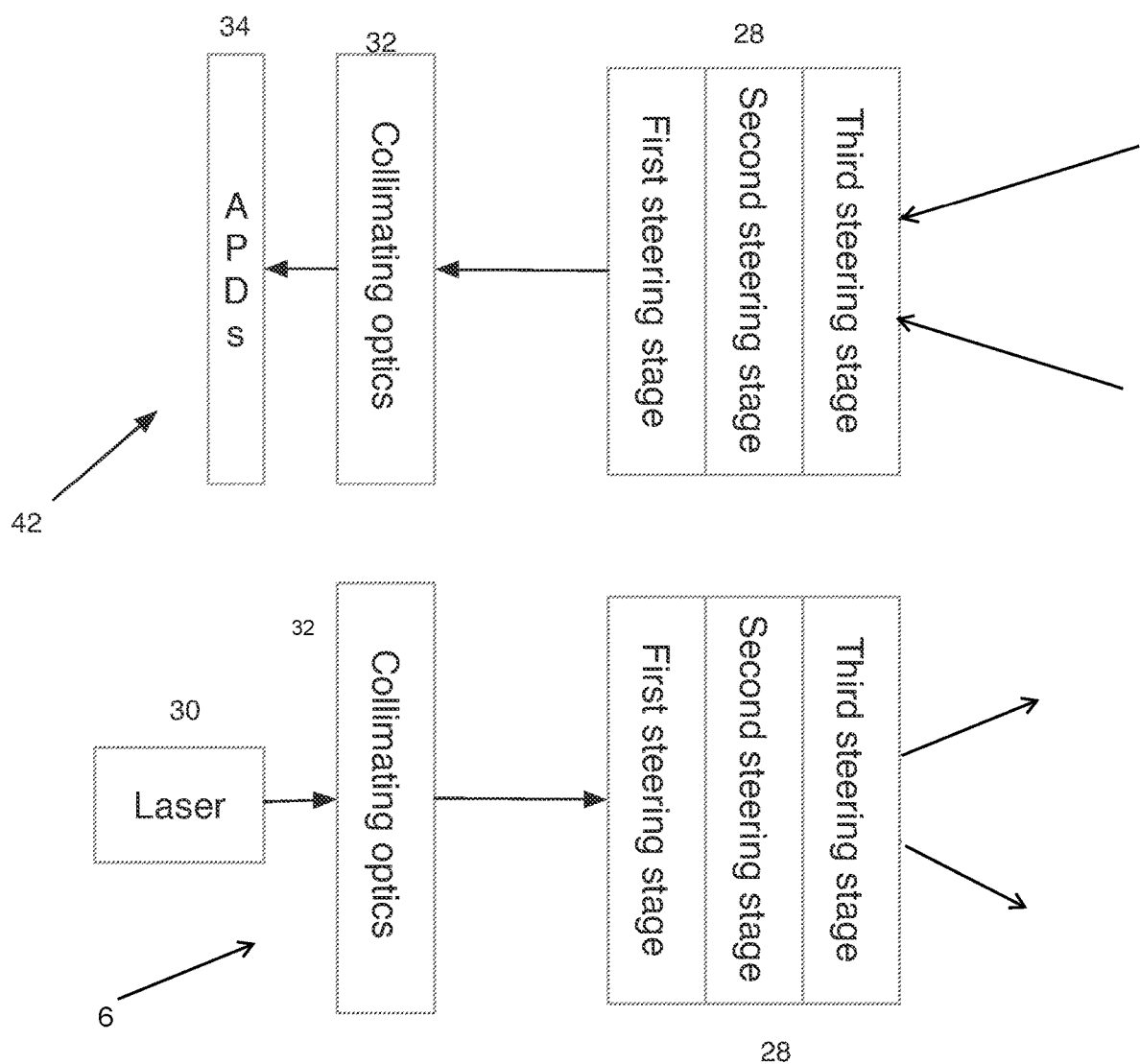
FIG. 3 is an arrangement which is a variant of the arrangement shown in FIG. 2.

FIG. 3 illustrates a variant of the architecture shown in FIG. 2, in which the transmitting and the receiving optical paths are separated and independent from each other. In this example, the LIDAR apparatus 10 has a transmitter 6 with a transmitting stage using a dedicated steering engine 28 and a receiver 42 using its own steering engine 28. Physically, both the receiver 42 and the transmitter 6 are placed in a housing side by side, either vertically or horizontally. It is to be noted that the transmitting steering engine and the receiving steering engine are controlled independently from each other. While in most situations their operations would be synchronized it is possible, they are not always synchronized.

Figure 4:
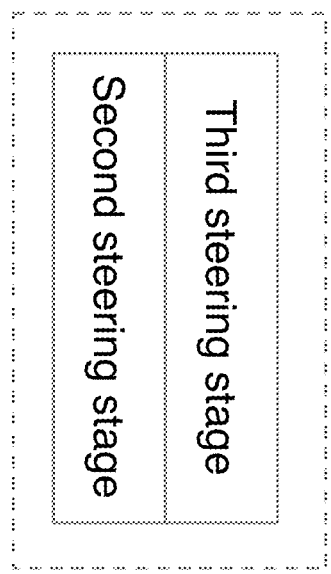
FIG. 4 is a more detailed block diagram of a solid-state steering engine which can be used in the LIDAR apparatus shown in FIG. 1.

With reference to FIG. 4, a block diagram of a preferred embodiment of the second and the third steering stages is shown, forming a solid-state steering engine 44. The solid-state steering engine 44 has no moving parts and includes a stack of plate-like optical elements. It will be understood that the solid-state steering engine 44 can be coupled with a separate first steering stage, such as the steering stage 20 using MEMS optical elements.

Figure 5A:
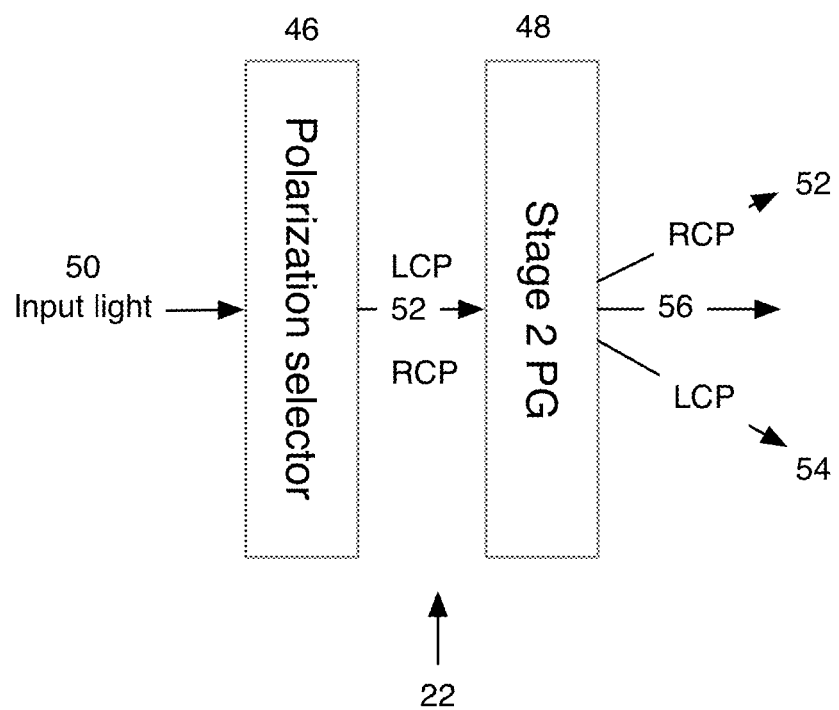
FIG. 5a is a block diagram illustrating a range of light propagation pathways of the second steering stage of the solid-state steering engine shown in FIG. 4, using a polarization grating in the active configuration.
Figure 5B:
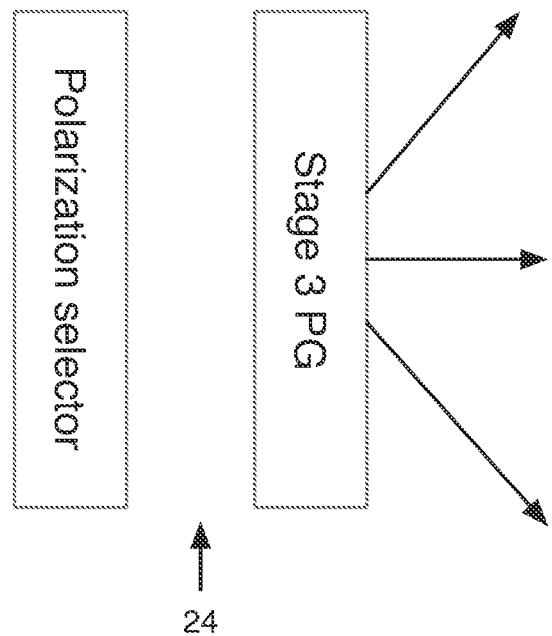
FIG. 5b is a block diagram showing the light propagation pathways of the third steering stage of the solid-state steering engine shown in FIG. 4.

With specific reference to FIG. 5a, the structure of the second steering stage 22 using an active polarization grating will be described. The second steering stage 22 has a plate-like polarization selector 46 stacked on a Polarization Grating (PG) 48, which is preferably is a Liquid Chrystal Polarization Grating (LCPG). The polarization selector is preferably switchable between a first mode that does not change the polarization of the incident light beam and a second mode that reverses the polarization of the light beam. In a specific example, the polarization selector includes a waveplate. For details about the construction of the polarization selector and the LCPG the reader is invited to refer to the description in the U.S. Pat. No. 8,982,313 the contents of which are hereby incorporated by reference.

As discussed later the beam-steering stage 22 is responsive to steering commands, which are electrical signals that set the operational modes of the polarization selector 46 and the PG 48 (to the extent those modes are changeable) to obtain the desired beam deflection such as the output beam projected toward the scene is directed at the desired location of the scene. By changing the steering commands and thus altering the operational modes of the optical components of the beam-steering engine 22, the light beam can be progressively displaced and walked over the scene to produce a scan in the selected pattern.

More specifically, input light 50 is received by the polarization selector that is configured to control the polarization state of the light beam. The input light has a circular polarization. If the laser 30 does not input directly circularly polarized light, which is likely to be the case of most implementations, additional optical elements will be required to impart to the light beam a circular polarization. Thus, the circularly polarized light that is input has either Left-hand Circular Polarization (LCP) or Right-hand Circular Polarization (RCP). The purpose of the polarization selector 46 is to alter the polarization of the light passing through the selector. More specifically, the polarization selector is a switchable liquid crystal layer that can be switched between two operational modes, in the first operational mode the polarization selector does not affect the polarization state of the light input while in the second operational mode the polarization selector alters the polarization state, such as for example reversing the handedness. Accordingly, assuming the input light is LCP polarized, in the first operational mode that does not affect the polarization state the output light will still be LCP polarized. However, if polarization selector is switched in the second operational mode, the LCP polarized input light will be RCP polarized at the output.

The polarization selector 46 is switched between the first operational mode and the second operational mode by applying a voltage to the polarization selector.

The PG 48 that receives the polarized light according to the selected handedness is configured to re-direct the light to an angle in relation to the incident light direction. The PG 48 has a director pattern that diffracts the polarized light into one of two directions, either a positive angle or a negative angle, depending on the polarization handedness. The PG 48 is also switchable between two operational modes. In the first operational mode the director pattern is intact such as to be able to perform the light diffraction. In the second operational mode the director pattern is distorted and acquires a structure where it can no longer diffract light, such that the light is not deflected, rather it exits along the same direction as the incident light.

In a first example, consider the situation where the input light 50 is LCP light. The polarization selector 46 is in an operational mode where the light it outputs is LCP light; in other words, the handedness of the original polarization is maintained. The LCP outgoing light enters the PG 48 that is an operational mode where the director pattern is intact, hence it diffracts the incoming light. Assume that the director pattern is configured such that the diffraction produces a positive deflection angle when the incoming light is LCP light. Accordingly, the light output by the PG 48 will follow the direction 52. Note that the in addition to re-directing the light, the PG 48 changes the handedness of the polarization accordingly the light output at 52 is now RCP light.

In a second example, assume that the polarization selector 46 is now switched to a different operational mode where the handedness of the light is altered. This means that the light input into the PG 48 is RCP light. The director pattern will now diffract the light according to a negative deflection angle, as per direction 54. Also, the handedness of the polarization will be flipped such that the outgoing light will be LCP light.

In a third example, assume now that the PG 48 is switched such that it acquires the second operational mode by applying a voltage to it in order to re-arrange the director pattern in a different structure where the director pattern no longer diffracts the incoming light. In that example, the PG 48 basically becomes a pass-through optical structure that does not change the direction of propagation of the light. In that operational mode, the PG 48 no longer alters the handedness of the polarization. For instance, LCP light that enters the PG 48 will be released as LCP light and RCP light will be released as RCP light along the direction 56.

Figure 5C:
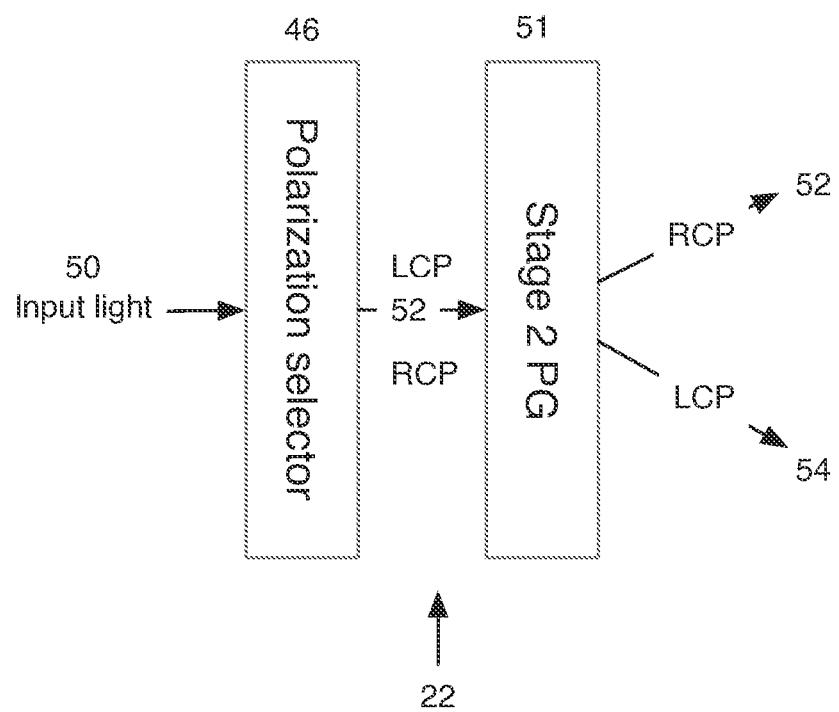
FIG. 5c is a block diagram illustrating a range of light propagation pathways of a variant of the second steering stage, using a polarization grating having a passive configuration.

In a variant, the PG is passive and it is not be switchable. This variant is shown in FIG. 5c. That is to say no signal is applied to it. In this form of construction, the director pattern which diffracts the incoming light beam is static. As a result, the PG 51 provides two angular deflection steps, one being a deflection with a positive deflection angle and the other a deflection with a negative deflection angle. Accordingly, the steering range provided by the PG 51 is defined by two light deflection directions that are angularly spaced apart from each other by an angle corresponding to the entire angular steering range. When the incident light beam has an LCP polarization the PG 51 deflects the light beam in one of the deflection directions and when the incident light beam has an RCP polarization the PG 51 deflects the light beam in the other deflection direction.

More specifically, FIG. 5c shows the light propagation directions achievable with the PG 51. Essentially, the light propagation directions are the same as those described in connection with FIG. 5a, the difference being that the light propagation direction 56 is missing and only two directions are possible 52 and 54. In contrast the switchable (active) PG 48 provides an additional propagation direction in which the light beam is not deflected. In this case, the steering range is defined by two discrete steps, the advantage being there is increased light beam-steering granularity relative to the passive example above.

The third steering stage 24 is identical to the second steering stage 22 and multiplies the number of discrete directions along which the light projected from the LIDAR apparatus 10, including increasing the angular deflection range since the light input into the second stage 22 is already deflected by the first stage. Additional solid-state steering stages will increase the selectable steps and the overall angular beam-steering range. Note, the third steering stage 24 can use an active PG or a passive PG.

Note that the above description was made in the context of beam-steering in the horizontal plane, but it can also be made in the vertical plane. To achieve steering in both horizontal and vertical directions additional steering stages can be provided to manage the vertical beam-steering.

The switching from one operational mode to another of the PG 48 or the polarization selector 46 is not an instantaneous event. When voltage is applied to the liquid crystal material the re-arranging of the director pattern in a new structure that does not diffract light is characterized by a switching on time. The director pattern will remain in that state as long as the voltage is maintained. When the voltage is removed, the director pattern will naturally return to its original configuration in which it diffracts light. This process is characterized by a relaxation time. The relaxation time is significantly longer than the switching on time. In a specific example of implementation, the switching on time is in the range of 100 microseconds to 25 microseconds. The relaxation time can vary in the range of 1.8 milliseconds to less than 600 microseconds.

Figure 8:
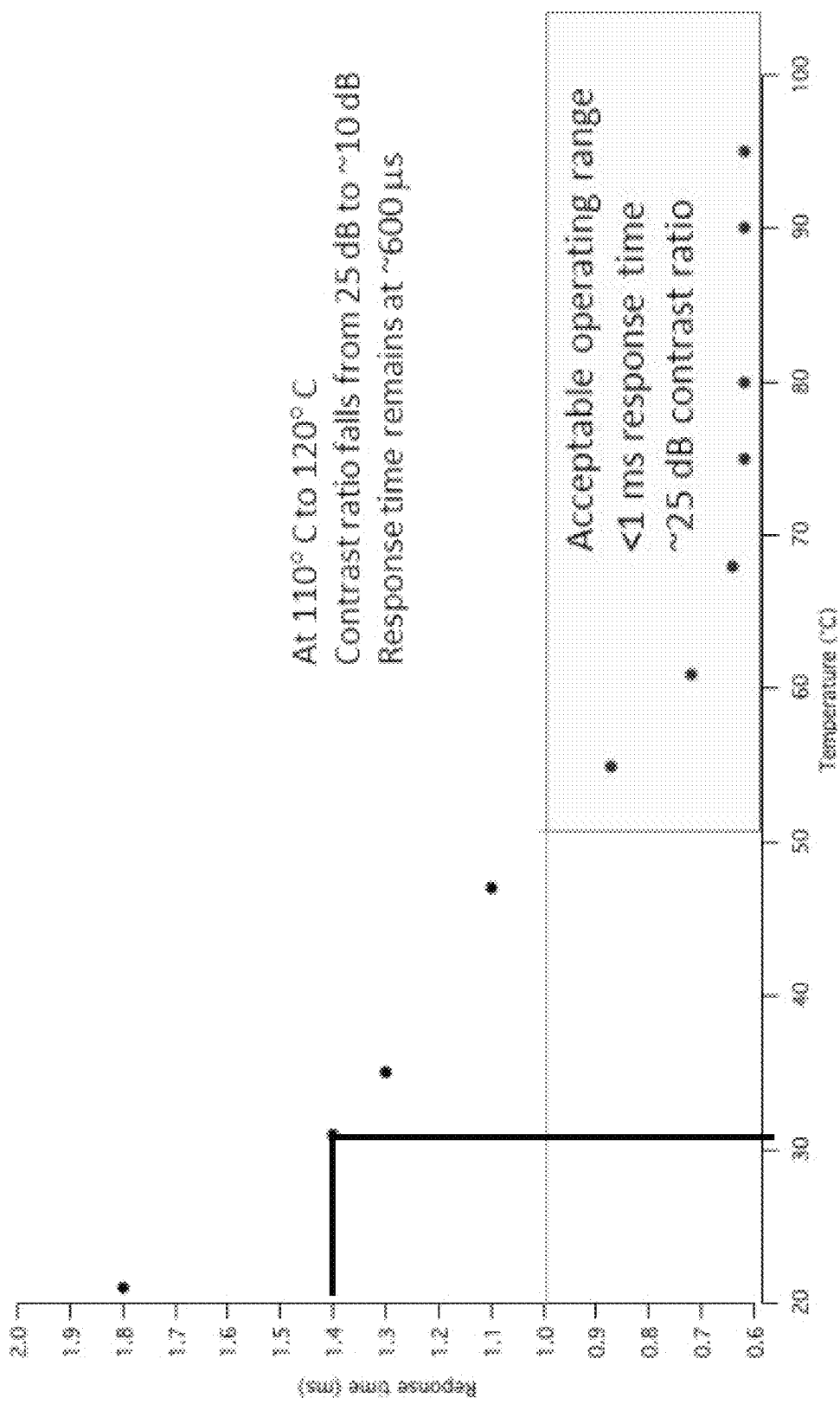
FIG. 8 is a graph illustrating the relaxation time of the polarization grating of the second or the third steering stages of the LIDAR apparatus with relation to temperature.

The relaxation time is temperature dependent. The graph in FIG. 8 shows that as the temperature of the PG 48 drops, the relaxation time increases. This is undesirable as an increase of the relaxation time would reduce the speed at which the beam can be switched, for example a switch from direction 52 to 56 or from 54 to 56. That, in turn, would affect the scanning speed of the LIDAR apparatus 10, which is the time necessary for the LIDAR apparatus 10 to scan the scene. Ultimately, the scanning speed affects the frame rate, which is the rate at which data frames of the point cloud are generated.

Several approaches can be considered to manage the transition times of the polarization selector (PS) 46 and/or the polarization grating 48, namely the switching on times and particularly the relaxation times and their effect on the overall performance of the LIDAR apparatus 10.

A first solution is to manage the temperature of the steering stages such that they remain in a temperature range where the transition times remain comparatively low. In a specific example, the shaded box in the graph of FIG. 8, identifies an operational range where the transition times, in particular the relaxation time is less than 1 millisecond. For the particular PG 48, PS 46 used, this translates in a temperature threshold that is above 52 degrees Celsius, preferably above 75 degrees Celsius, it being understood that different PG or PS constructions can have different temperature thresholds and ranges associated with them.

Figure 6:
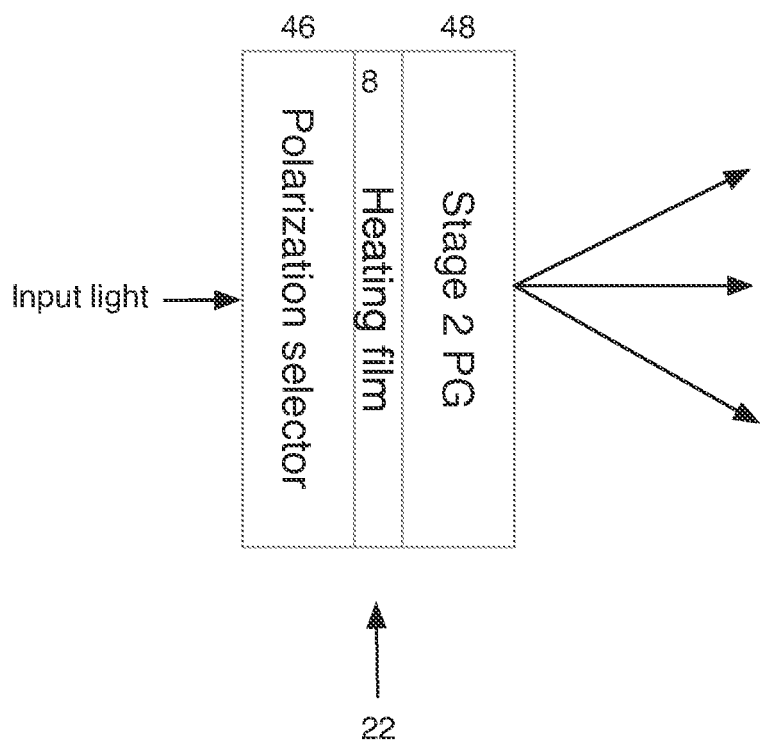
FIG. 6 is a block diagram showing the second steering stage of FIG. 5a provided with a heating element to manage the operational temperature of the second steering stage.

FIG. 6 illustrates an example of implementation where the steering stage 22 (the same would also be true for the steering stage 24) is provided with a heating element to manage the operational temperature of the steering stage. The heating element is in the form of a transparent or substantially transparent film 8 that is electrically conductive and has a sufficient resistance to be able to produce the thermal energy necessary to maintain the steering stage 22 at a temperature that is above 52 degrees Celsius and preferably substantially above that threshold. The film 8 can be made of Indium Tin Oxide (ITO). The specific composition of the ITO film 8 is selected to provide the desired light transmission properties and desired electrical conductivity in order to be able to heat the steering stage 22 at the desired temperature. It is preferred to use a film 8 that has elevated heat generation capacity to bring the steering engine up to the desired temperature relatively fast. This is useful at start-up, especially in cold climates where the temperature of the steering stage 22 may be at the sub-zero level and it is desirable to heat up quickly the steering stage 22 such as to be able to achieve a minimal operational data frame rate of the point cloud.

Electrodes, not shown in the drawings are provided at the edges exposed edges of the film 8 to create the current flow into the film.

Figure 7:
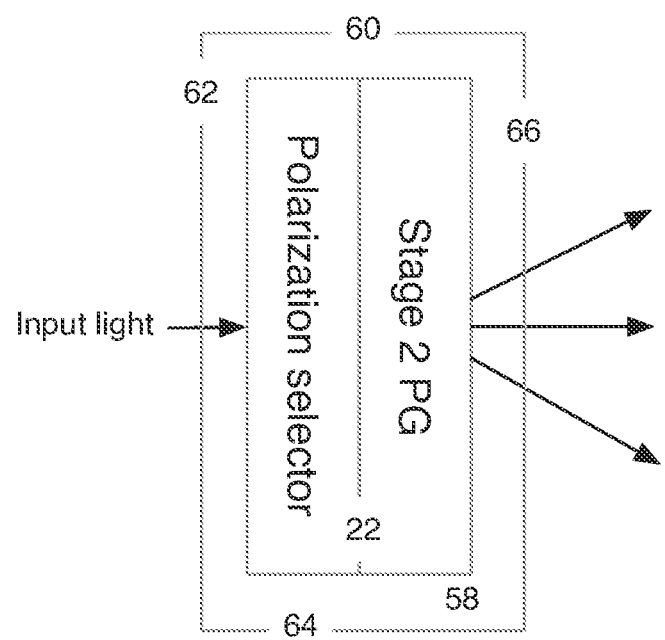
FIG. 7 is a block diagram of the second steering stage mounted in a heated enclosure to manage the operational temperature of the second steering stage.

In a possible variant shown in FIG. 7, the steering engine 22 is placed in an enclosure 58 which is thermally controlled. The enclosure has sides and defines a chamber in which a substantially higher temperature can be maintained than the ambient temperature. In the example shown in the drawings the enclosure has walls 60, 62, 64 and 66. The wall 66 is a transparent window to allow the light to pass through such that the LIDAR apparatus 10 can scan the scene and receive reflected or backscattered light from the scene. If the light transmitting stage and the light receiving stage reside outside the enclosure 60, the wall 62 will also be transparent. The temperature control in the enclosure can be achieved by a heating element placed at any suitable location in the enclosure 58. For instance, the transparent window can be heated to control the temperature of the enclosure and dissipate any fog or condensation that may form on the external surface of the window in applications where the external surface is exposed to elements that can induce formation of such fog or condensation.

Another approach to manage the transition times, which can be used in addition to the temperature control is the synchronization between the switching of multiple steering stages. If transition times are necessary, it would be desirable for such transition times to occur concurrently between stages instead of sequentially. In this fashion, the overall transition time, which is the time for all the stages to transition to the desired operational state would be reduced.

Figure 10:
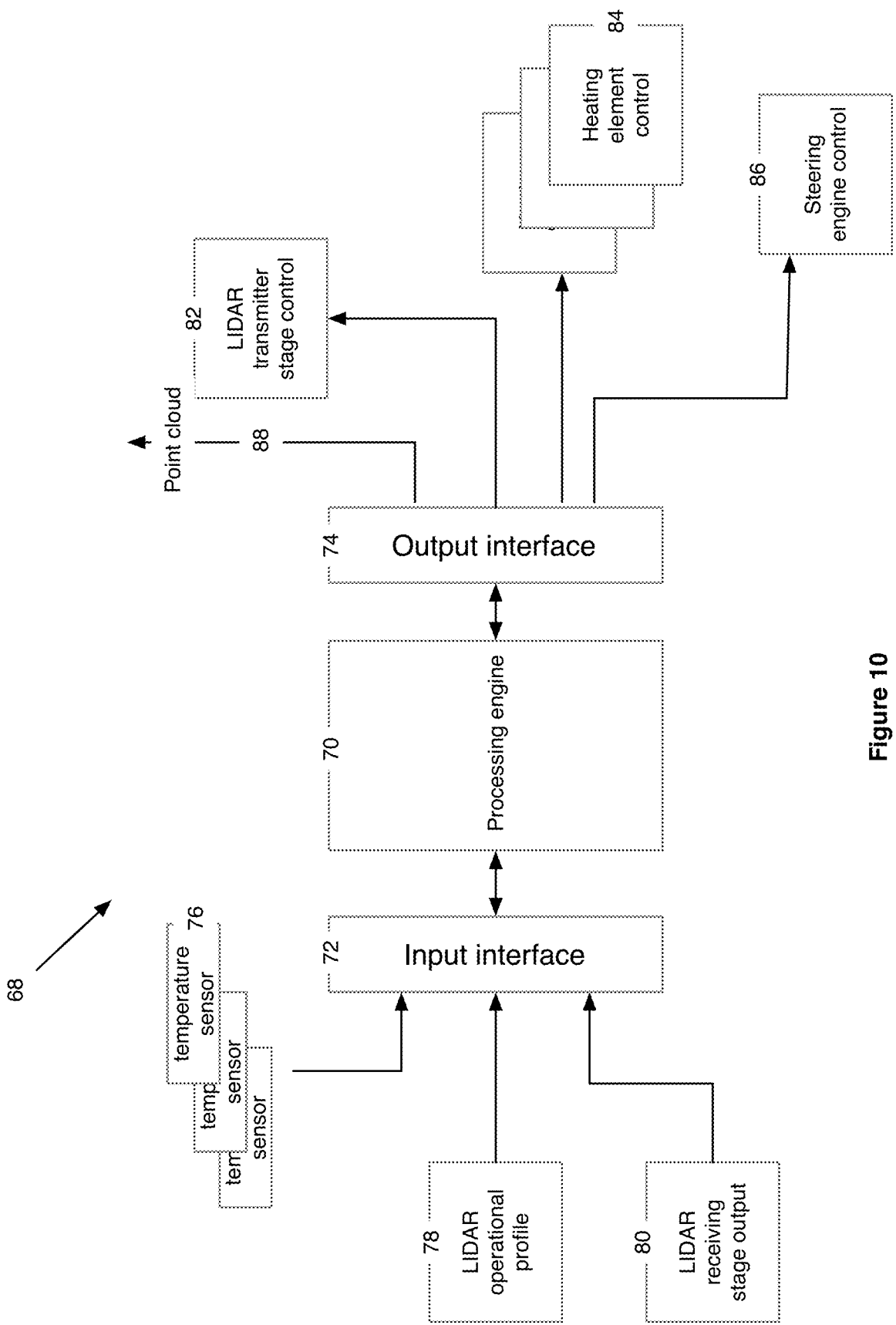
FIG. 10 is a block diagram of a controller of the LIDAR apparatus shown in FIG. 1.

The control of the LIDAR apparatus 10 in general and the switching of the various steering stages in particular is controlled by a controller 68. A block diagram of the controller is shown in FIG. 10. The controller has a processing engine 70 which includes one or more CPUs executing software in the form of machine instructions encoded on a non-transitory machine-readable medium. The instructions define the overall functionality of the processing engine 70.

The controller 68 has an input interface that receives inputs from external entities. These inputs are in the form of signals which the processing engine processes and generates outputs via the output interface 74. The outputs would typically be control signals to drive components of the LIDAR apparatus 10. Also, the output interface 74 outputs the point cloud sensed by the LIDAR apparatus 10 and which is the 3D representation of the scene.

The temperature sensor 76 provides information about the temperature of the steering engine. The temperature sensor can be placed at any suitable location on the steering engine such as to sense the temperature. As the block diagram at FIG. 10 shows, there are multiple temperature sensors 76, one per steering stage. If the LIDAR apparatus 10 has the capability to control the temperature of multiple heating elements, one per steering stage for example, the independent temperature sensing per steering stage allows to tailor the temperature to each stage independently. This may be useful in instances where the steering stages are not identical, and each may have different operational temperature thresholds.

The lidar operational profile 78 is a configuration setting that conveys a number of parameters of the LIDAR apparatus 10 that can be varied to tailor the operation of the LIDAR apparatus 10 to a range of different operational conditions. For example, the LIDAR apparatus can be adjusted such as to focus the sensing in one area of the scene at the expense of other areas of the scene. This would be the case in instances where objects of interest are identified in some portion of the scene and it would be desirable to focus the LIDAR apparatus in that area to get more resolution on the objects of interest. The LIDAR apparatus can also be configured to such as to increase the amplitude of the optical scanning beam for a longer-range scanning where objects of interest reside at a longer distance from the LIDAR apparatus 10. Conversely, the intensity of the light beam may be reduced in instances where objects of interest, in particular objects that have strong reflections, such as road signs, are close. In that situation an optical beam of strong intensity would produce optical returns that are of high intensity also, making it more difficult for the sensitive surface 34 to handle. In fact, it is possible that such strong returns saturate the APDs.

Figure 11:
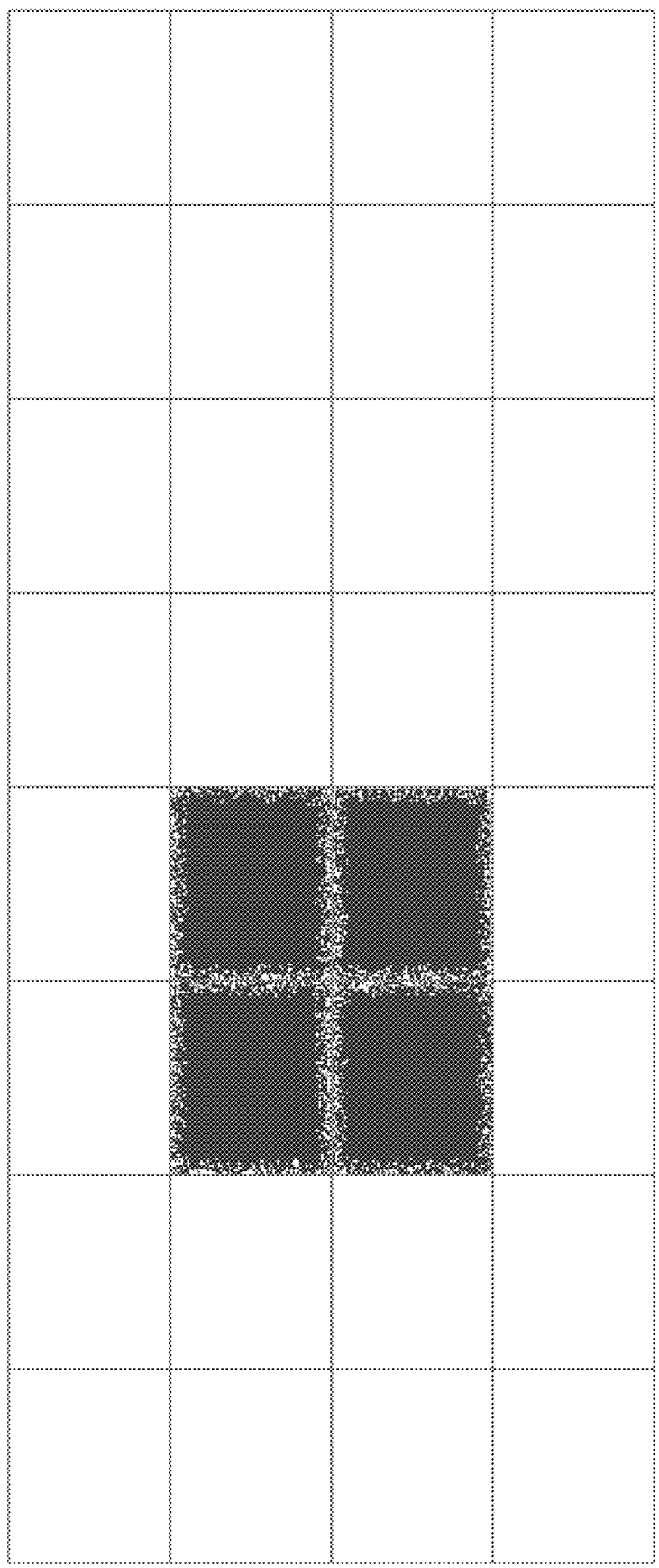
FIG. 11 is an illustration depicting a field of view of the LIDAR apparatus of FIG. 1 divided onto selectable tiles.

In a specific mode of implementation, the LIDAR operational profile conveys the following controllable parameters of the LIDAR apparatus 10:

1. Intensity of the light beam generated by the laser source 30. For example, the profile can specify a setting among N possible power settings.
2. Area of the scene that is to be scanned. This setting can be characterized in numerous ways. One possibility is to define a window in the overall field of view in which the light beam is to be directed. In a specific example, the field of view can be divided in virtual tiles and the setting can specify which tile or set of tiles are to be scanned. FIG. 11 illustrates an example of a field of view divided in tiles, the arrangement being such that there are four rows of eight tiles each, for a total of thirty-two tiles. The setting can specify a subset of tiles that are to be scanned. For instance, the setting may convey the coordinates of the selected sub-set of tiles, such that the optical beam excursions will be restricted to the requested sub-set of tiles. In the example shown, the highlighted set of four tiles is stated in the profile and the optical beam will be controlled such that it scans the area defined by the four tiles only. Note, the set of tiles do not need to be contiguous. Once the definition of the tiles is provided to the controller 68, the logic of the controller can determine the operational setting of the steering engine in order to obtain the desired beam scan.
3. More generally, the profile can specify more or less resolution in certain areas, whether in the X and Y plane or in the X, Y and Z space and let the controller 68 determine the actual LIDAR apparatus 10 settings to achieve the desired resolution in the desired area. Assuming the field of view is characterized as a series of tiles, the setting can provide an indication of the subset of tiles and the degree of resolution that is desired. The controller 68 would automatically set the various parameters of the LIDAR apparatus 10 such as the beam intensity and steering engine operation parameters, among others.

In a specific example of implementation, the controller 68 may have a library of LIDAR operational profiles. Each entry in this library correspond to a different set of operational settings and the controller 68 is configured to dynamically switch between operational profiles. The input 78 may therefore only convey the index in the library such that the controller 68, upon receipt of the index can identify the requested profile, read the settings in that profile and adjust the operation of the LIDAR apparatus 10 accordingly. The controller 68 switches between profiles as requested by the path planning controller, when the LIDAR apparatus 10 is used in autonomous or semi-autonomous automotive applications. That is to say, the planning path controller determines which LIDAR operational mode is best suited for path planning purposes and issues a request to that effect, which can be the index in the library of profiles.

The lidar receiving stage output also feeds into the controller 68 which essentially reads the output of the APDs, applies algorithms to detect distances for various points in the scene and generates a point cloud, which is a 3D representation of the scene. Optionally, the controller 68 can perform detection in the point cloud to identify objects. The detected objects and the point cloud are output at 88 through the output interface 74. The point cloud is output as a succession of data frames.

The output interface 74 releases the point cloud at 88 and optionally detected objects information. In addition, it releases control signals at 82 to control the laser source 30 and control signals 86 to operate the steering engine. The signals 86 to operate the steering engine include steering commands such as switching signals for each steering stage. For example, the switching signals include a polarization switching signals for the polarization selector 46 and switching signals for the PG 48.

Figure 12:
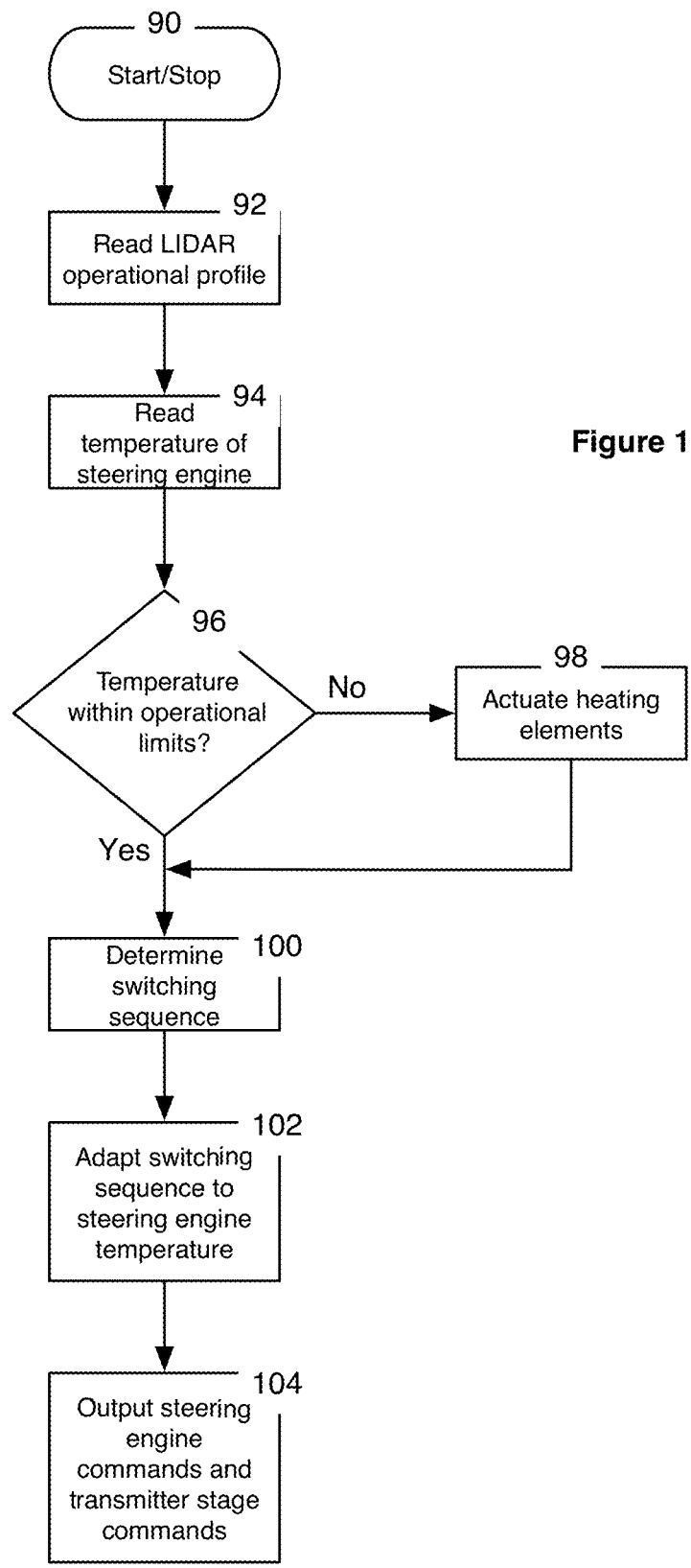
FIG. 12 is a flowchart of a process implemented by the controller shown in FIG. 10.

FIG. 12 is a flowchart of the operation of the controller 68. The process starts at 90. At step 92 the controller 68 reads the requested LIDAR operational profile from the library. At step 94, the controller 68 reads the temperature sensor 76 of the steering engine. For multiple sensors, they are read separately. At step 96, the controller determines if the temperature of the steering engine is in the established operational window. For example, that window can be the shaded area in the graph of FIG. 8. Here, the controller 68 considers that as long as the temperature of the steering engine is above 52 degrees Celsius, the steering engine is in an operational state that meets minimal performance requirements.

Outside this temperature range, the controller 68 may output an error message or a "wait" message to the path planning controller to indicate that for the moment no reliable lidar data is available. Alternatively, the controller 68 may switch to a LIDAR operational profile that does not require repeated switching operations, in particular transitions that require relaxion transitions.

For example, the controller 68 may set the operational state to one where the steering engine acts as a pass through where light beam is projected along the incident direction without deflection. In this fashion it is possible to obtain some initial read of the scene that may be usable by the path planning controller to initiate the movement of the vehicle. The controller 68 also notifies the path planning controller that the lidar operational mode that is being implemented is different from the one requested to make sure the point cloud data is interpreted correctly.

At step 98 the heating element is actuated to raise the temperature of the steering stage (s) of the steering engine. It should be noted that the heating operation can be effected to merely bring the temperature of the steering stages within the operational window or at a higher degree that will provide better switching performance. That is to say, the heating will continue beyond the 52 degrees Celsius limit to a higher set point where the relaxation time is near an optimal point. For example, by heating the steering engine to a temperature of 75 degrees Celsius or above, the relaxation time drops to 600 microseconds, while at 52 degrees Celsius it is around 1 millisecond. Accordingly, it is preferred that the heating step 98 is performed in a way to quickly bring the steering engine within the broad operational range and then the heating is managed to keep the temperature of the steering engine within a tighter window where the switching times are improved such that they remain below 1 millisecond, preferably below 800 microseconds and even more preferably below 600 microseconds.

At step 100 the controller 68 determines the switching sequence for the various steering stages of the LIDAR apparatus 10 on the basis of the requested operational profile. That step assumes that since the temperature of the steering engine is now in the correct operational range the default or start-up profile has been replaced with the initially requested profile from the path planning controller.

The switching sequence is the state of the various signals driving the polarization selector and the PG of each steering stage. The switching sequence determines the angular deflection of the beam projected by the LIDAR apparatus into the scene. For a horizontal and a vertical steering LIDAR apparatus, the angular deflection would be characterized by a horizontal deflection angle and by a vertical deflection angle.

Figure 13:
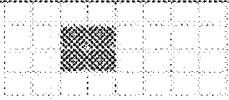
FIG. 13 is a non-limiting example of a look-up table showing correspondence between the active tiles and the switching commands that can be encoded in such table.
Figure 13:
Figure 13:

In a specific mode of operation, the switching sequence is determined by the active tiles specified in the operational profile of the LIDAR apparatus 10. That is to say, a particular sub-set of tiles is mapped to a corresponding set of switching commands that are selected such as to restrict the light beam motion to the active tiles only. The switching commands set the state of the polarization selectors and the state of the PGs of the various steering stages to produce beam deflection angles maintaining the beam within the active tiles. In terms of implementation, the correspondence between the active tiles and the switching commands can be encoded in a look-up table. The entry in the table is the combination of active tiles and the table outputs the sequence of switching commands. A high-level structure of the look up table is shown in FIG. 13.

The table holds the list of all the possible sequences of active tiles that may exist in a profile. The first column in the table shows three exemplary sequences, where each sequence identifies active tiles in the grid of the field of view and corresponds to a specific area of the field of view to be scanned. For each sequence of active tiles, a corresponding switching commands sequence is pre-calculated. A typical switching command sequence would include a set of polarization selector and/or PG settings for each steering stage. An example of a switching command sequence is shown in the table. That example assumes that the steering engine has two stages (22 and 24). Also note that the values provided in the cells are arbitrary and they do not produce in practice any particular active tile sequence. The values are merely provided to show the kind of information that would be stored in the table.

|  | Steering stage # 2 | | Steering stage # 3 | | |
| --- | --- | --- | --- | --- | --- |
| Command # | Polarization selector (voltage) | PG (voltage) | Polarization selector (voltage) | PG (voltage) | Dwell time |
| 1 | ON | OFF | ON | ON | 50 microseconds |
| 2 | ON | OFF | OFF | OFF | 600 microseconds |
| 3 | OFF | ON | ON | ON | 50 microseconds |

The sequence includes a series of commands, three in the above example, where each command defines the voltages applied to the polarization selector and the voltage applied to the PG of each steering stage, thus defining the deflection imparted to the light beam by that particular steering stage. By cycling the steering engine from one command to the other, the beam walks, step by step. Accordingly, the commands define the motion of the beam such that the beam remains generally in the active tiles. The commands also define the order of the beam steps within the active tiles, namely the scanning pattern within the active tiles.

When the last command is executed, it is followed by the first command and so on. In other words, the commands form an endless loop and they run continuously, until a new sequence of tiles is requested.

The dwell time is the time delay between the implementation of each command, in other words it is the time the controller 68 maintains the steering engine in the operational mode determined by the active command before changing the voltages to implement the subsequent command. From the perspective of scanning speed, it would be desirable to cycle through the commands as quickly as possible, however, the transition times of the steering stages need to be taken into account in order to let the PS and/or PG stabilize before switching them again. It should be noted that the dwell times are not always the same from one command to the other. For instance, if the switch to the next command from the current command of the steering engine involves switch on time, the cycling can be faster. However, if the current command involves relaxion time, the dwell time will be longer.

At step 102 the dwell times for the selected switching sequence are adapted according to the current temperature of the steering stages of the steering engine. Assume for instance that the LIDAR apparatus 10 is not yet at the optimal temperature, but within the minimal performance temperature window. The dwell times can be adjusted to take into account the increased relaxation times by adding more delay for commands that involve PS and/or PG relaxation. However, as the temperature progressively increases, the dwell time is dynamically adapted to pull delay as the relaxation time of the PS and/or PG decreases. Accordingly, as the temperature increases, the scan speed will also increase up to a point where it stabilizes when the steering engine temperature reaches the optimal temperature.

Figure 14:
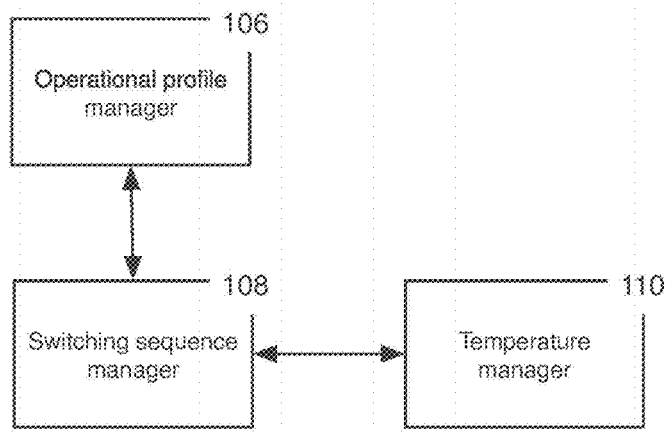
FIG. 14 is a block diagram of the software implementing the functionalities of the controller shown at FIG. 10.

For further clarity, FIG. 14 is a block diagram illustrating the functional blocks of the software executed by the controller 68 and which implements the above functionality. The software has an operational profile manger functional block 106, a switching sequence manager functional block 108 and a temperature manager 110. The operational profile manager 106 will interpret the specified operational profile of the LIDAR apparatus 100 and extract the relevant settings such as laser power, and active tiles in the field of view. The switching sequence manger 108 will determine the switching sequence on the basis of the active tiles and other relevant settings that obtained from the operational profile manager 106. As to the temperature manager 110, it controls the temperature of the various steering stages of the steering engine and modulates the switching commands. It should be noted that the logic for performing the above functions, as described above uses look-up tables, but this is not a strict requirement as different implementations are possible. For example, a software model of the steering engine may be provided which takes as an input the active tiles or any other form of characterization of the desired operation of the lidar and outputs switching commands to achieve that operation.

Referring back to the flowchart of FIG. 12, at step 104 the controller 68 thus outputs the steering engine commands as described earlier which are temperature compensated and also commands to operate the transmitter stage, in particular commands to modulate the light intensity.

Note that for applications that use a first steering stage with a continuous motion optical element, additional settings in the operational profile will be necessary to control the motion of the optical element.

The invention claimed is:

1. A LIDAR apparatus for scanning a scene, comprising:
a. a transmitter stage for generating a light beam,
b. a receiver stage,
c. a beam-steering engine configured to steer the light beam to scan at least a portion of the scene, the beam-steering engine including:
i. a first steering stage to steer the light beam in a first steering range by performing a continuous angular deflection of the light beam within the first steering range,
ii. a second steering stage to steer the light beam in a second steering range by performing a stepwise angular deflection of the light beam within the second steering range, wherein the second steering stage includes a light-transmissive heating layer, a polarization selector, and a polarization grating, the light-transmissive heating layer configured to be sandwiched between the polarization selector and the polarization grating and configured to heat both the polarization selector and the polarization grating.

2. The LIDAR apparatus as defined in claim 1, wherein the second steering stage is located downstream the first steering stage, wherein the second steering stage steers the light beam initially steered by the first steering stage.

3. The LIDAR apparatus as defined in claim 1, wherein the first steering stage includes an optical component that is continuously moveable to produce the continuous angular deflection of the light beam.

4. The LIDAR apparatus as defined in claim 3, wherein the optical component is a mirror.

5. The LIDAR apparatus as defined in claim 4, wherein the first steering stage includes a Micro-Electro-Mechanical System (MEMS) responsive to a steering signal to continuously move the mirror to produce the continuous angular deflection of the light beam.

6. The LIDAR apparatus as defined in claim 1, wherein the second steering stage is responsive to a steering signal to deflect the light beam in a step selected among a finite number of steps in the second steering range.

7. The LIDAR apparatus as defined in claim 1, wherein the polarization grating is a liquid crystal polarization grating.

8. The LIDAR apparatus as defined in claim 1, wherein the second steering stage is configured to alter a polarization of the input light beam and alter a propagation angle thereof.

9. The LIDAR apparatus as defined in claim 1, wherein the polarization selector is configured to alter a handedness of a circular polarization of an incident light beam.

10. The LIDAR apparatus as defined in claim 1, wherein the second steering range is defined between a first light beam propagation direction and a second light beam propagation direction at an angle with relation to the first light beam propagation direction, the second steering range being configured such that the light beam is displaced from the first light beam propagation direction to the second light beam propagation direction in a single discrete step.

11. The LIDAR apparatus as defined in claim 1, wherein the second steering range is defined between a first light beam propagation direction and a second light beam propagation direction at an angle with relation to the first light beam propagation direction, the second steering range being configured such that the light beam is displaced from the first light beam propagation direction to the second light beam propagation direction in multiple discrete steps that define at least a third light propagation direction angularly spaced from the first and second light beam propagation direction and residing therebetween.

12. The LIDAR apparatus as defined in claim 1, wherein the LIDAR apparatus further comprises a controller configured to generate a succession of switching commands that are applied to the second steering stage.

13. The LIDAR apparatus as defined in claim 12, wherein each two switching commands of the succession of switching commands include a dwell time interval.

14. The LIDAR apparatus as defined in claim 13, wherein the dwell time interval varies based on an order of the two switching commands.

15. A method for scanning a scene, comprising:
providing a LIDAR apparatus including:
a. a transmitter stage for generating a light beam,
b. a receiver stage,
c. a beam-steering engine configured to steer the light beam to scan at least a portion of the scene,
scanning the scene using the beam-steering engine by (i) steering the light beam in a first steering range by performing a continuous angular deflection of the light beam within the first steering range; and (ii) steering the light beam in a second steering range by performing a stepwise angular deflection of the light beam within the second steering range, wherein the second steering stage includes a light-transmissive heating layer, a polarization selector, and a polarization grating, the light-transmissive heating layer configured to be sandwiched between the polarization selector and the polarization grating to heat both the polarization selector and the polarization grating;
sensing an optical return with the receiver stage; and
generating an output conveying a three-dimensional (3D) representation of the scene.

16. The method as defined in claim 15, wherein the second steering stage is located downstream the first steering stage, wherein the second steering stage steers the light beam initially steered by the first steering stage.

17. The method as defined in claim 15, wherein the first steering stage includes an optical component that is continuously moveable to produce the continuous deflection of the light beam.

18. The method as defined in claim 17, wherein the optical component is a mirror.

19. The method as defined in claim 17, wherein the first steering stage includes a Micro-Electro-Mechanical System (MEMS) responsive to a steering signal to continuously move the mirror to produce the continuous deflection of the light beam.

20. The method as defined in claim 15, wherein the second steering stage is responsive to a steering signal to deflect the light beam in a step selected among a finite number of angular steps in the second steering range.

\* \* \* \* \*